(12) United States Patent
Ishikawa et al.

(10) Patent No.: US 8,176,359 B2
(45) Date of Patent: *May 8, 2012

(54) DISK ARRAY SYSTEM AND CONTROL METHOD THEREOF

(75) Inventors: Atsushi Ishikawa, Minami-Ashigara (JP); Kenji Onabe, Odawara (JP)

(73) Assignee: Hitachi, Ltd., Tokyo (JP)

( * ) Notice: Subject to any disclaimer, the term of this patent is extended or adjusted under 35 U.S.C. 154(b) by 495 days.

This patent is subject to a terminal disclaimer.

(21) Appl. No.: 12/365,293

(22) Filed: Feb. 4, 2009

(65) Prior Publication Data

US 2009/0199042 A1     Aug. 6, 2009

Related U.S. Application Data

(63) Continuation of application No. 11/274,339, filed on Nov. 16, 2005, now Pat. No. 7,502,955.

(30) Foreign Application Priority Data

Sep. 21, 2005 (JP) ................................ 2005-274145

(51) Int. Cl.
G06F 11/00 (2006.01)

(52) U.S. Cl. ...................................... 714/6.1; 714/6.11

(58) Field of Classification Search ................... 714/6.1, 714/6.11, 6.12, 6.13, 6.2, 6.21, 6.22, 6.23; 711/114, 162

See application file for complete search history.

(56) References Cited

U.S. PATENT DOCUMENTS

| 6,606,690 B2 | 8/2003 | Padovano |
| 6,804,755 B2 | 10/2004 | Selkirk et al. |
| 7,028,216 B2 | 4/2006 | Aizawa et al. |
| 7,222,259 B2 | 5/2007 | Tanaka et al. |
| 7,249,277 B2 * | 7/2007 | Arai et al. ..................... 714/6.21 |
| 2002/0156984 A1 * | 10/2002 | Padovano ..................... 711/148 |
| 2002/0178335 A1 | 11/2002 | Selkirk et al. |
| 2003/0005248 A1 | 1/2003 | Selkirk et al. |
| 2007/0174676 A1 | 7/2007 | Tanaka et al. |

* cited by examiner

*Primary Examiner* — Dieu-Minh Le
(74) *Attorney, Agent, or Firm* — Mattingly & Malur, PC

(57) ABSTRACT

A disk array system, upon detecting a failure in any data disk from among a plurality of data disks providing one or more RAID groups, conducting a correction copy to any spare disk, using one or more other data disks belonging to the same RAID group as the data disk causing the failure. When the data disk causing the failure has been replaced with a new data disk, the disk array system alters the management so that the data disk can be managed as a spare disk, and the spare disk can be managed as a data disk.

6 Claims, 6 Drawing Sheets

FIG.4

RAID CONFIGURATION MANAGEMENT TABLE 101

| RG NUMBER | LOGICAL HDD NUMBER | CHASSIS NUMBER | PHYSICAL HDD NUMBER |
|---|---|---|---|
| RG# 0 | LOGICAL HDD# 0 | CHASSIS # 0 | PHYSICAL HDD# 13 |
|  | LOGICAL HDD# 1 | CHASSIS # 3 | PHYSICAL HDD# 7 |
|  | LOGICAL HDD# 2 | CHASSIS # 1 | PHYSICAL HDD# 3 |
|  | LOGICAL HDD# 3 | CHASSIS # 3 | PHYSICAL HDD# 5 |
| RG# 1 | LOGICAL HDD# 0 | CHASSIS # 0 | PHYSICAL HDD# 6 |
|  | LOGICAL HDD# 1 | CHASSIS # 4 | PHYSICAL HDD# 2 |
|  | LOGICAL HDD# 2 | CHASSIS # 4 | PHYSICAL HDD# 4 |
|  | LOGICAL HDD# 3 | CHASSIS # 2 | PHYSICAL HDD# 9 |

FIG.5

SPARE DISK MANAGEMENT TABLE 102

| SPARE HDD NUMBER | CHASSIS NUMBER | PHYSICAL HDD NUMBER | USAGE STATUS |
|---|---|---|---|
| SPARE HDD# 0 | CHASSIS # 4 | PHYSICAL HDD# 10 | IN USE |
| SPARE HDD# 1 | CHASSIS # 5 | PHYSICAL HDD# 0 | NOT IN USE |
| SPARE HDD# 2 | CHASSIS # 6 | PHYSICAL HDD# 1 | IN USE |

FIG.6

DISK DRIVE ATTRIBUTE MANAGEMENT TABLE 103

| CHASSIS NUMBER | PHYSICAL HDD NUMBER | DRIVE TYPE | DISK CAPACITY | DISK ROTATION SPEED |
|---|---|---|---|---|
| CHASSIS # 0 | PHYSICAL HDD# 0 | FC | 300GB | 10K rpm |
| CHASSIS # 0 | PHYSICAL HDD# 1 | FC | 150GB | 15K rpm |
| CHASSIS # 0 | PHYSICAL HDD# 2 | SATA | 400GB | 7200 rpm |

DISK ARRAY SYSTEM AND CONTROL METHOD THEREOF

CROSS-REFERENCES TO RELATED APPLICATIONS

This application is a Continuation of application Ser. No. 11/274,339 filed on Nov. 16, 2005 now U.S. Pat. No. 7,502,955 and claims priority from Japanese Patent Application No. 2005-274145, filed on Sep. 21, 2005, the entire disclosure of which is incorporated herein by reference.

BACKGROUND OF THE INVENTION

The present invention relates to a disk array system having a plurality of disk drives with a RAID (Redundant Arrays of Independent Disks) configuration, and a method for controlling the disk array system.

In a disk system array system having a plurality of disk drives with a RAID configuration, data processing is performed by driving a plurality of disk drives in parallel. For example, a disk array system, upon receipt of a write command from a host system, adds redundant data to the write data, and then divides the write data among a plurality of disk drives to write the data thereto. Meanwhile, a disk array system, upon receipt of a read command from a host system, reads in parallel the data written among the disk drives, and transmits it to the host system. This kind of disk array system has the function of, upon the occurrence of any failure in any of its disk drives storing data therein, correcting the error using the redundant data, and operating in degraded mode.

In degraded operation, in which redundancy is low, it has been normal to recover data by performing correction copy of the data to a spare disk. When the data recovery to the spare disk is complete and the failed disk drive manually replaced with a new disk drive, the data re-built in the spare disk is copied back to that new disk drive.

SUMMARY OF THE INVENTION

However, with the increase in disk drive capacity, there has been the problem of speedy data recovery, since a correction copy requires a long period of time and additionally requires the same long period of time when performing copyback. For example, a disk array system having 400 GB SATA disk drives will require approximately ten hours for data re-building using a correction copy to a spare disk, and a further ten hours for copyback of the re-built data to a new data disk.

Therefore, an object of the present invention is to solve the aforementioned problem and provide a disk array system that makes it possible to reduce data recovery time, and a method for controlling the same.

In order to achieve the object, the disk array system according to the present invention includes: a plurality of data disks providing one or more RAID groups; one or more spare disks; a controller for controlling data input/output to/from the data disks and the spare disks; a RAID configuration management table for registering a correspondence relationship between a logical location and a physical location for each of the data disks in the RAID groups; and a spare disk management table for registering a correspondence relationship between a logical location and a physical location for each of the spare disks. The controller, upon a failure occurring in any of the data disks, performing a correction copy to any of the spare disks using other data disks belonging to the same RAID group the data disk causing the failure belongs to, and executing update processing on the RAID configuration management table and the spare disk management table so as to interchange the physical locations of the spare disk to which the correction copy has been performed and of the data disk causing the failure. After the completion of the correction copy to the spare disk, the disk management for the data disk and the spare disk is altered, thereby omitting copyback and thus reducing the data recovery time by half compared with conventional techniques.

Upon an error rate for any of the data disks exceeding a predetermined threshold value, the controller may copy data stored in the data disk with the error rate exceeding the predetermined value to any of the spare disks, and execute update processing on the RAID configuration management table and the spare disk management table so as to interchange the physical locations of the spare disk to which the copy has been performed and of the data disk with the error rate exceeding the predetermined value.

The present invention makes it possible to reduce data recovery time.

BRIEF DESCRIPTION OF THE DRAWINGS

FIG. 4 is an explanatory diagram of a RAID configuration management table according to an embodiment of the present invention.

FIG. 5 is an explanatory diagram of a spare disk management table according to an embodiment of the present invention.

FIG. 6 is an explanatory diagram of a disk drive attribute management table according to an embodiment of the present invention.

DETAILED DESCRIPTION OF THE PREFERRED EMBODIMENTS

Hereinafter, an embodiment of the present invention is explained with reference to each of the drawings.

Figure 1:
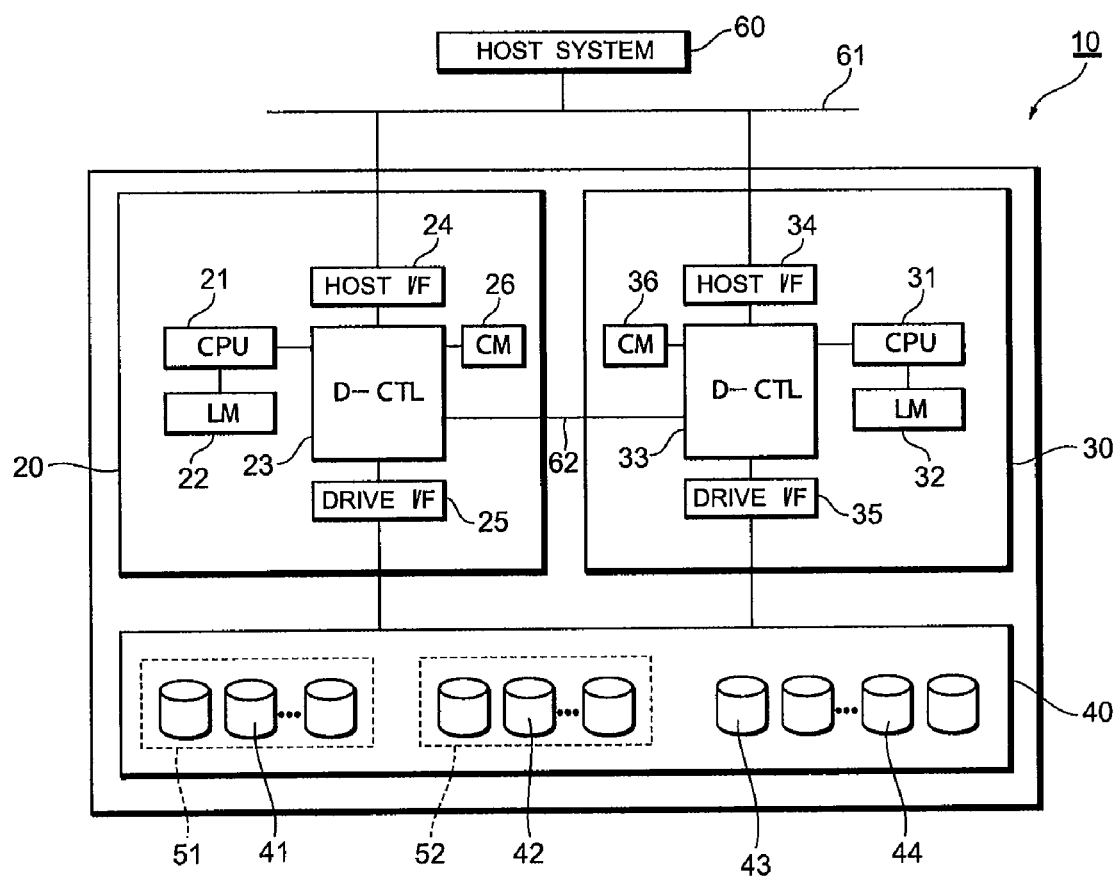
FIG. 1 is a diagram showing the configuration of a disk array system according to an embodiment of the present invention.

FIG. 1 shows the main configuration of a disk array system 10 according to an embodiment of the present invention. The disk array system 10 is connected to one or more host systems 60 via a communication network 61. A host system 60 may be a personal computer, a workstation, a mainframe, or the like. The host system 60 has Web application software, streaming application software, e-business application software or the like installed thereon.

For the communication network 61, a SAN (Storage Area Network), a LAN (Local Area Network), the Internet, a dedicated line, a public line or the like may be used. When the host system 60 is connected to the disk array system 10 via a SAN, the host system 60 requests data input/output in blocks—units of data management for storage resources in the disk array system 10—according to a protocol such as Fiber Channel Protocol, or iSCSI (internet Small Computer System Interface) Protocol. When the host system 60 is connected to the disk array system 10 via a LAN, the host system 60 requests file-based data input/output by designating a file name, according to a protocol such as NFS (Network File System) Protocol or CIFS (Common Interface File System) Protocol. In order for the disk array system 10 to accept a file access request from the host system 60, it is necessary for the disk array system 10 to have the NAS (Network Attached Storage) function.

The disk array system 10 is mainly composed of dual controllers 20 and 30, and a storage apparatus 40.

The storage apparatus 40 includes a plurality of data disks 41 and 42 that provide one or more RAID groups 51 and 52, and also includes one or more spare disks 43 and 44. For the data disks 41 and 42 and the spare disks 43 and 44, various types of disk drives, such as FC (Fiber Channel) disk drives, SATA (Serial Advanced Technology Attachment) disk drives, PATA (Parallel Advanced Technology Attachment) disk drives, FATA (Fibre Attached Technology Adapted) disk drives and SCSI (Small Computer System Interface) disk drives may be used. For ease of explanation, this embodiment shows the case where FC disk drives are used for the data disks 41 and the spare disk 43, and SATA disk drives are used for the data disks 42 and the spare disk 44. Hereinafter, except as otherwise noted, the data disks 41 and 42 and the spare disks 43 and 44 are collectively referred to as the disk drives.

The RAID group 51 is formed by, for example, grouping four data disks 41 (3D+1P), or grouping eight data disks 41 (7D+P1). In other words, one RAID group 51 is formed by gathering the respective storage areas provided by a plurality of data disks 41. Similarly, the RAID group 52 is formed by, for example, grouping four data disks 42 one group (3D+1P), or grouping eight data disks 42 one group (7D+P1). In other words, one RAID group 52 is formed by gathering the respective storage areas provided by a plurality of data disks 42. The RAID groups 51 and 52 can also be referred to as parity groups, or ECC groups.

The controller 20 or 30 can control the storage system 40 at a RAID level (e.g., 0, 1, or 5) according to the RAID method. In the RAID group, one or more logical units, which are units of access from the host system 60, are defined. Each logical unit is assigned a LUN (Logical Unit Number).

The controller 20 is mainly composed of a CPU 21, local memory (LM) 22, a data transfer control unit (D-CTL) 23, a host I/F control unit 24, a drive I/F control unit 25 and cache memory (CM) 26.

The CPU 21 is a processor that controls I/O processing (write access/read access) for the storage apparatus 40 in response to data input/output requests from the host system 60. The local memory 22 stores a microprogram (including a control program required for the copyback-less processing as described later) for the CPU 21, the various tables described later (RAID configuration management table 101, spare disk management table 102, and disk drive attribute management table 103). The cache memory 26 is buffer memory that temporarily stores write data to be written in the storage apparatus 40 or read data read from the storage apparatus 40. The cache memory 26, which is supported with a backup power supply, is non-volatile memory preventing cache data loss, even in case of a power failure occurring in the disk array system 10.

The data transfer control unit 23, which interconnects the host I/F control unit 24, the drive I/F control unit 25 and the cache memory 26, controls data transfer between the host system 60 and the storage apparatus 40. Specifically, the data transfer unit 23, upon write access by the host system 60, writes the write data received from the host system 60 via the host I/F control unit 24 to the cache memory 26. The drive I/F control unit 25 writes the write data written in the cache memory 26 to the storage apparatus 40. Meanwhile, the data transfer control unit 23, upon read access by the host system 60, writes the read data read from the storage apparatus 40 via the drive I/F control unit 25 to the cache memory 26 and also transfers that data to the host I/F control unit 24.

The host I/F control unit 24, which is a controller that controls the interface between the host system 60 and the controller 20, has the function to receive, for example, block access requests from the host system 60 according to Fibre Channel Protocol, or file access requests from the host system 60 according to File Transfer Protocol. The drive I/F control unit 25, which is a controller for controlling the interface between the controller 20 and the storage apparatus 40, has the function to control, for example, data input/output requests to/from the storage apparatus 40 according to the protocol controlling the storage apparatus 40.

The controller 30 includes a CPU 31, local memory (LM) 32, a data transfer control unit (D-CTL) 33, a host I/F control unit 34, a drive I/F control unit 35, and cache memory (CM) 36, and has the same configuration as the controller 20.

The data transfer control units 23 and 33 are connected via a data bus 62, and data is transferred between them so that data written in one cache memory 26 can be duplicated in the other cache memory 36. Also, when the storage apparatus 40 is managed at the RAID 5 level, the data transfer control units 23 and 33 compute parity data.

Figure 2:
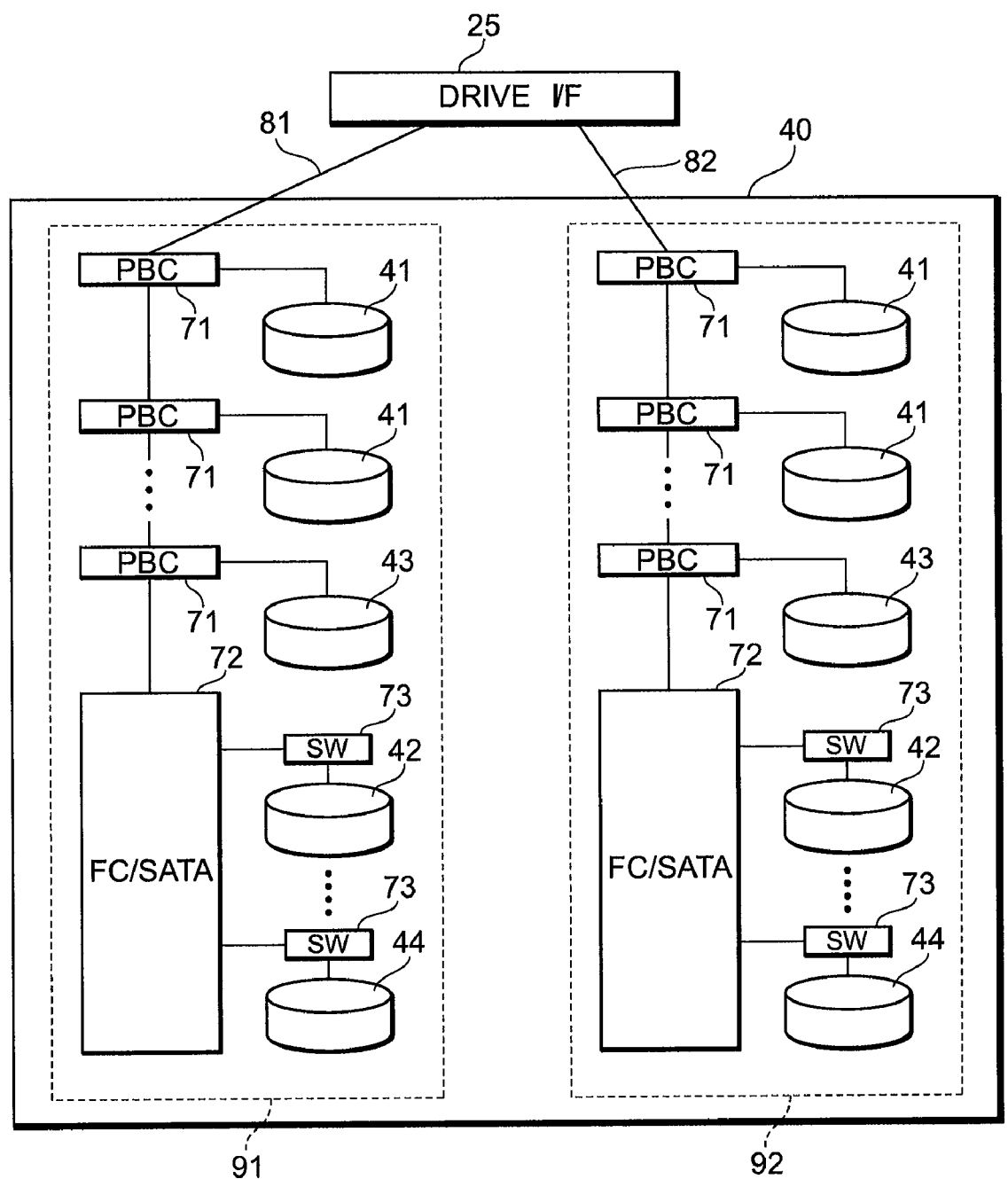
FIG. 2 is a diagram showing the detailed configuration of a back-end interface of a disk array system according to an embodiment of the present invention.

FIG. 2 shows the detailed configuration of a back-end interface of the disk array system 10. The drive I/F control unit 25 is connected to a plurality of FC-ALs (Fibre Channel Arbitrated Loops) 81 and 82. The FC-AL 81, which constitutes a first back-end loop 91, is connected to the data disks 41 and the spare disk 43 via port bypass circuits (PBC) 71, and also to the data disks 42 and the spare disk 44 via an FC/SATA converter 72 and switches 73. Similarly, the FC-AL 82, which constitutes a second back-end loop 92, is connected to the data disks 41 and the spare disk 43 via port bypass circuits (PBC) 71, and also to the data disks 42 and the spare disk 44 via an FC/SATA converter 72 and switches 73.

The FC disks (data disks 41 and spare disk 43), and the SATA disks (data disks 42 and spare disk 44) may be mounted in an identical chassis, and may also be mounted in separate chasses. For example, the FC disks may be mounted in a basic chassis while the SATA disks are mounted in an additional chassis. Also, a single type of disk drive (e.g., FC disks or SATA disks only) may be mounted in the disk array system 10.

Next is a brief explanation of copyback-less processing with reference to FIGS. 3A to 3D. In the Figures, "D" indicates that the disk is being managed as a data disk, and "S" indicates that the disk is being managed as a spare disk.

Figure 3A:
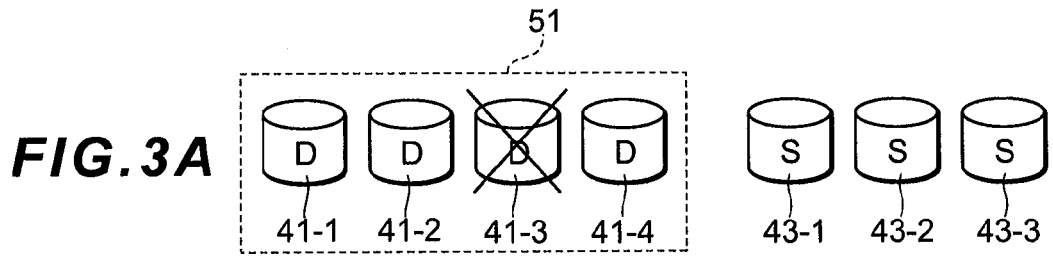
FIG. 3A-3D are diagrams for briefly explaining the copyback-less processing according to an embodiment of the present invention.

As shown in FIG. 3A, the case where any data disk 41-3, from among a plurality of data disks 41-1, 41-2, 41-3, and 41-4 providing a RAID group 51, causes a failure is considered below.

Figure 3B:
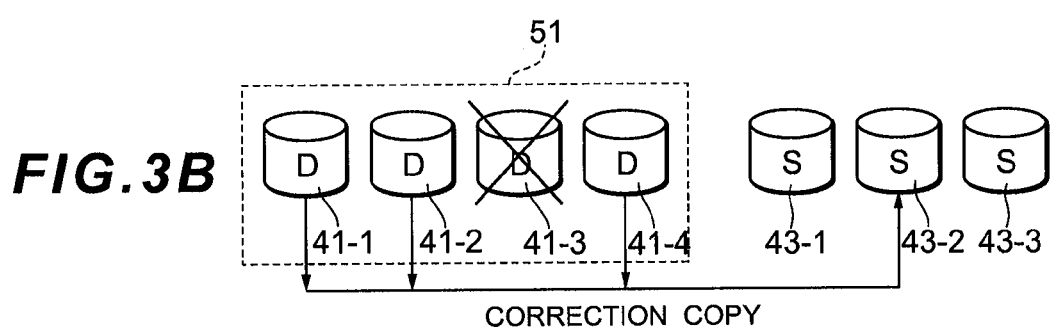

As shown in FIG. 3B, the controller 20 or 30 performs correction copy using the other data disks 41-1, 41-2, and 41-4 belonging to the same RAID group 51 as the failed data disk 41-3, to any spare disk 43-2 from among a plurality of spare disks 43-1, 43-2, and 43-3, thereby recovering all the data in the failed data disk 41-3. For the spare disk 43-2 where correction copy is performed, it is preferable to select a disk having physical specifications identical or close to those of the failed data disk 41-3. The detailed selection criteria for the spare disk 43 are described later.

Figure 3C:
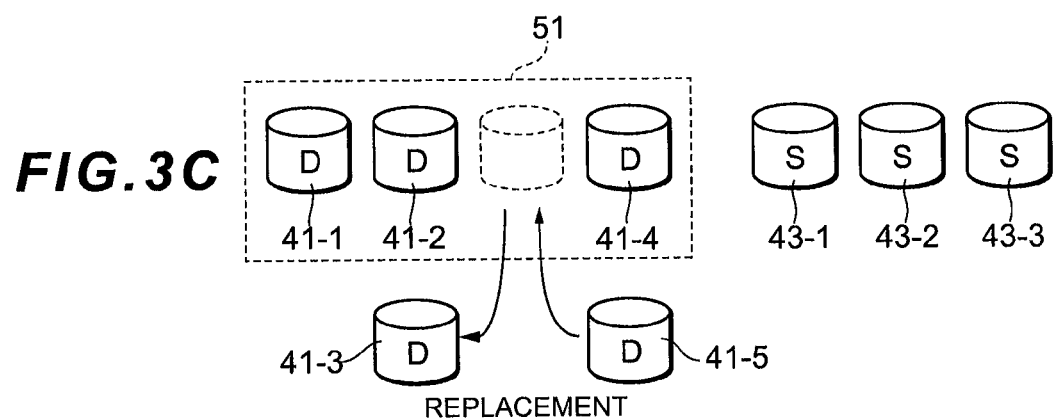

As shown in FIG. 3C, upon the completion of the correction copy, the data disk 41-3 is manually replaced with a new data disk 41-5 by an administrator. The physical location of the data disk 41-3, and the physical location of the data disk 41-5 is the same.

Figure 3D:
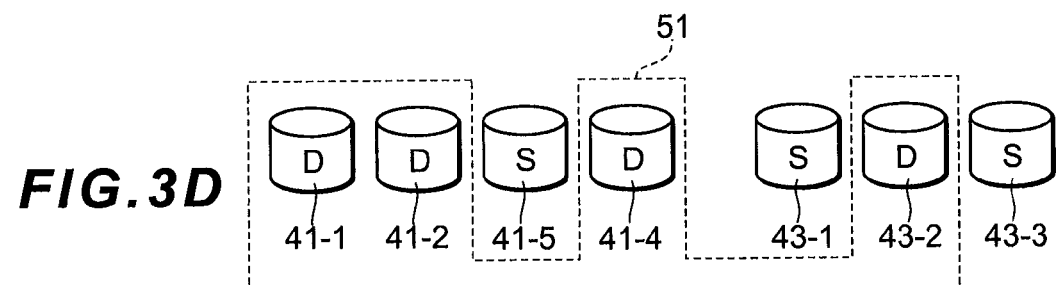

As shown in FIG. 3D, the controller 20 or 30 alters the disk management so that the spare disk 43-2 can operate as a data disk from that time. Furthermore, the controller 20 or 30 alters the disk management so that the new data disk 41-5 can operate as a spare disk from that time. With the alternation of the disk management, the disks constituting the RAID group 51 will be changed to the data disks 41-1, 41-2, 41-4, and 43-2. The aforementioned disk management alternation makes it possible to omit copyback from the spare disk 43-2 to the data disk 41-5 and thus reduce the data recovery time by half compared with the time consumed in conventional techniques.

The copyback-less processing can be adopted not only when a failure occurs in a data disk, but also when dynamic sparing is performed. Dynamic sparing refers to copying of data in a data disk to a spare disk before the data disk causes a failure when the access error rate of that data disk exceeds a predetermined threshold value. In the copyback-less processing in this embodiment, once data is copied to a spare disk by dynamic sparing, the disk management is altered so that that spare disk can operate as a data disk from that time. The disk management is further altered so that a new data disk, which has been mounted as a replacement for the data disk with an access error rate exceeding the predetermined value, can operate as a spare disk from that time. The aforementioned disk management alternation makes it possible to omit copyback from the spare disk to the new data disk and thus reduce data recovery time by half compared with the time consumed in conventional techniques.

Next, various tables used for disk management are explained below with reference to FIGS. 4 to 6.

FIG. 4 shows a RAID configuration management table 101. The RAID configuration management table 101 is a table for managing the correspondence relationships between the logical locations and physical locations of the RAID group-constituting data disks 41 and 42, and registering that correspondence relationship information. The logical locations of the data disks 41 and 42 are each defined by, for example, a combination of RAID group numbers (RG#) for identifying the RAID groups, and logical HDD numbers (LOGICAL HDD #) indicating the logical locations of the data disks 41 and 42 in the RAID groups. The physical locations of the data disks 41 and 42 are defined by, for example, a combination of chassis numbers (CHASSIS #) for identifying chasses mounting the data disks 41 and 42 therein, and physical HDD numbers (PHYSICAL HDD#) indicating physical locations in the chasses where the data disks 41 and 42 are mounted.

FIG. 5 shows a spare disk management table 102. The spare disk management table 120 is a table for managing the correspondence relationships between the logical locations and physical locations of the spare disks 43 and 44, and registering that correspondence relationship information. The logical locations of the spare disks 43 and 44 are defined by, for example, spare HDD numbers (SPARE HDD #) for uniquely identifying spare disks 43 and 44. The physical locations of the spare disks 43 and 44 are defined by, for example, a combination of chassis numbers (CHASSIS #) for identifying chasses mounting the spare disks 43 and 44 therein, and physical HDD numbers (PHYSICAL HDD#) indicating the physical locations in the chasses where the spare disks 43 and 44 are mounted. The spare disk management table 102 further manages the usage status of the respective spare disks 43 and 44 (IN USE or NOT IN USE).

FIG. 6 shows a disk drive attribute management table 103. The disk drive attribute management table 103 is a table for managing the drive type, disk capacity and disk rotation speed of the disk drives (the data disks 41 and 42, and the spare disks 43 and 44), and registering that information. The disk drive attribute management table 103 manages the chassis numbers (CHASSIS #) for identifying the chasses mounting the disk drives therein, the physical HDD numbers indicating the physical locations in the chasses where the disk drives are mounted, and the drive type, disk capacity, and disk rotation speed of each disk drive, respectively in relation to each other. The drive type refers to the type of disk drive (i.e., the distinction between FC disks, SATA disks, PATA disks, FATA disks, SCSI disks or similar). The disk capacity refers to the storage capacities of the disk drives. The disk rotation speed refers to the rated rotation frequencies of the disk drives.

The disk drive attribute management table 103 can be prepared using the values in response to SCSI commands, such as the inquiry command, the Mode Sense command or the Read Capacity, issued by the controller 20 or 30 to the storage apparatus 40 upon the disk array system 10 being booted.

In this embodiment, the management and operation of the "data disks" and the "spare disks" is not fixed, but may be dynamically changed by management alternation of the above RAID configuration management table 101, and the spare disk management table 102. For example, a disk drive having a physical HDD number registered in the RAID configuration management table 101 is managed and operates as a data disk. However, if that physical HDD number is deleted from the RAID configuration management table 101, and the physical HDD number is registered in the spare disk management table 102, that disk drive will be managed and also operate as a spare disk from the point in time when it is registered in the spare disk management table 102.

Next, spare disk selection criteria are explained below. In copyback-less processing, a spare disk on which data recovery processing has been performed is changed to be a data disk, and therefore, if the physical specifications of the data recovery target data disk are different from those of the spare disk on which data recovery has been performed, performance deterioration or a problem in system operation may arise. Therefore, it is necessary to properly select a spare disk having physical specifications identical or close to those of the data recovery target data disk from among the plurality of spare disks. Examples of the physical specifications that can be spare disk selection criteria include drive type, disk rotation speed, disk capacity and the loop to which the disk belongs.

It is important also, from the viewpoint of quality assurance, that a plurality of data disks constituting a RAID group is comprised of disk drives of the same drive type. So, drive type is a high-priority selection criterion. For example, selecting an FC spare disk 43 as a replacement disk drive for an FC data disk 41 is preferable.

It is also preferable that the plurality of data disks constituting a RAID group have the same disk rotation speed, because if there is any variation in disk rotation speed in a RAID group, the rotation speed for the data disks may be controlled at the lowest disk rotation speed, making it impossible to fully utilize the capacity of the disk drives.

The disk capacity of the spare disk needs to be a disk capacity at least identical to or exceeding the disk capacity of the data recovery target data disk. For selection priority, it is referable that, first, a spare disk having the same disk capacity as that of the data recovery target data disk is selected, and that if there is no such spare disk, a spare disk having a disk capacity greater than that of the data recovery target data disk is selected.

It is preferable that the back-end loop to which the spare disk belongs be the same loop the data recovery target data disk belongs to because if the back-end loop to which the spare disk belongs is different from the one the data disk belongs to, bias will occur in the number of data disks (loop loads) between the back-end loops.

When the aforementioned physical specifications are adopted as spare disk selection criteria, it is preferable to select a spare disk upon setting the specification criteria priority in the order of "drive type," "disk rotation speed," "disk capacity," and "loop to which the spare disk belongs." The physical specifications for spare disk selection criteria are not limited to the above examples, and other physical specifications may be adopted or the selection criteria priority may arbitrarily be changed according to the system configuration.

Figure 7:
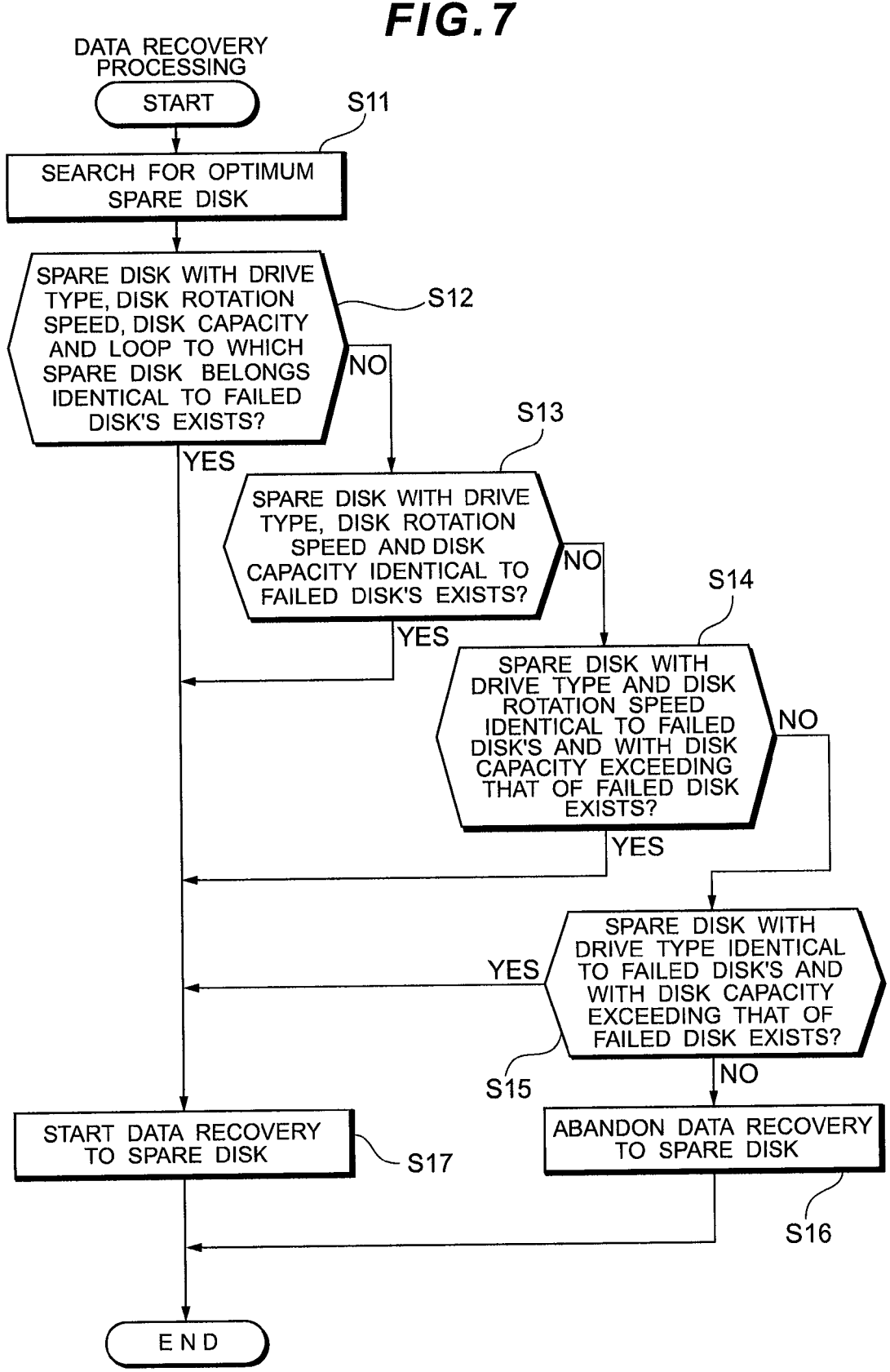
FIG. 7 is a flowchart showing a data recovery processing routine according to an embodiment of the present invention.

Next, the data recovery processing routine is explained below with reference to FIG. 7. When a failure that requires a correction copy to a spare disk occurs in a data disk, or the need to perform dynamic sparing arises as a result of the error rate for a data disk exceeding a predetermined threshold value, the data recovery routine is called from the main routine of the controller 20 or 30 and executed.

Upon the data recovery processing routine being called, the controller 20 or 30, referring to the spare disk management table 102 and the RAID configuration management table 101, starts the search for an optimum spare disk (S11).

The controller 20 or 30 checks whether or not any unused spare disk with a drive type, disk rotation speed, disk capacity, and loop to which the disk belongs, identical to those for the data recovery target data disk exists (S12).

If a spare disk satisfying the above search conditions exists (S12: YES), correction copy or dynamic sparing is performed on that spare disk to conduct data recovery (S17). If no spare disk satisfying the search conditions exists (S12: NO), the controller 20 or 30 checks whether any unused spare disk having a drive type, disk rotation speed, and disk capacity identical to those for the data recovery target data disk exists (S13).

If a spare disk satisfying the search conditions exists (S13: YES), correction copy or dynamic sparing is performed on that spare disk to conduct data recovery (S17). If no spare disk satisfying the search conditions exists (S13: NO), the controller 20 or 30 checks whether or not any unused spare disk having a drive type and disk rotation speed identical to those for the data recovery target data disk and a storage capacity exceeding that of the data recovery target data disk exists (S14).

If a spare disk satisfying those search conditions exists (S14: YES), correction copy or dynamic sparing is performed on that spare disk to conduct data recovery (S17). If no spare disk satisfying the above search conditions exists (S14: NO), the controller 20 or 30 checks whether or not any spare disk having a drive type identical to that of the data recovery target data disk, and a storage capacity exceeding that of the data recovery target data disk exists (S15).

If a spare disk satisfying the above search conditions exists (S15: YES), correction copy or dynamic sparing is performed on that spare disk to conduct data recovery (S17). If no spare disk satisfying the search conditions exists (S15: NO), the controller 20 or 30 abandons data recovery (S16).

Figure 8:
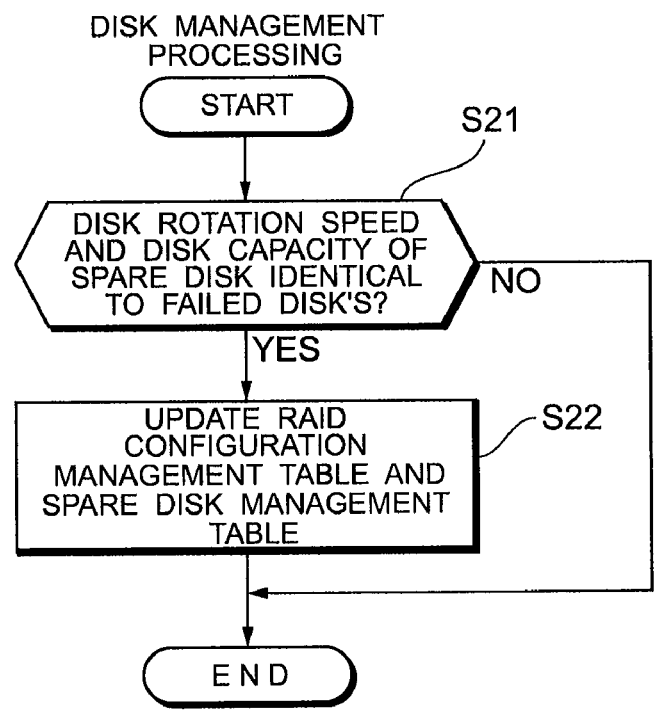
FIG. 8 is a flowchart showing a disk management processing routine according to an embodiment of the present invention.

Next, the disk management processing routine is explained below with reference to FIG. 8. The disk management processing routine is called from the controller 20 or 30 and executed at the stage where the data in the data disk has been recovered by the correction copy or dynamic sparing performed on the spare disk.

When the disk management processing routine is called, the controller 20 or 30 checks whether or not the disk rotation speed and disk capacity for the spare disk are identical to those for the data recovery target data disk (S21).

If the identicality conditions are satisfied (S21: YES), the controller 20 or 30 performs copyback-less processing to interchange the relevant physical HDD number in the RAID configuration management table 101 and the relevant physical HDD number in the spare disk management table 102 (S22). Consequently, the spare disk on which data recovery has been performed is changed to be managed as a data disk. A new data disk mounted in the physical location of the data recovery target data disk as its replacement is managed as a spare disk.

Meanwhile, if the identicality conditions are not satisfied (S21: NO), the controller 20 or 30 skips the processing for altering the disk management (S22), and leaves the disk management routine and returns to the main routine.

The aforementioned processing is one example, and may arbitrarily be changed according to the system configuration of the disk array system 10, or similar. For example, if the check result at S21 shown in FIG. 8 is "NO," copyback may be conducted from the spare disk to the new data disk mounted in the physical location of the data recovery target data disk as its replacement.

Furthermore, the spare disk selection based on physical specifications is not necessarily performed before data recovery processing. For example, it is also possible to check whether or not the physical specifications of a spare disk are identical or close to those of the data recovery target data disk after the data has been recovered in the spare disk. If the physical specifications for the spare disk on which the data recovery has been performed are identical or close to those for the data recovery target data disk, processing for altering disk management may be conducted. If the specifications are not identical to each other, copyback may be performed from the spare disk to the new data disk mounted in the physical location of the data recovery target data disk as its replacement.

Also, a spare disk for each data disk may be assigned in advance for data recovery when a failure occurs in the data disk, or when the error rate for the data disk exceeds a predetermined threshold value.

Performing copyback-less processing results in a plurality of data disks constituting the same RAID group being dispersed in a chassis. Some administrators may desire that the plurality of data disks constituting the same RAID group be placed collectively at one location. The function for a system administrator to manually direct copyback to the disk array system 10 in order to adjust the physical locations of the data disks may be added.

Figure 9:
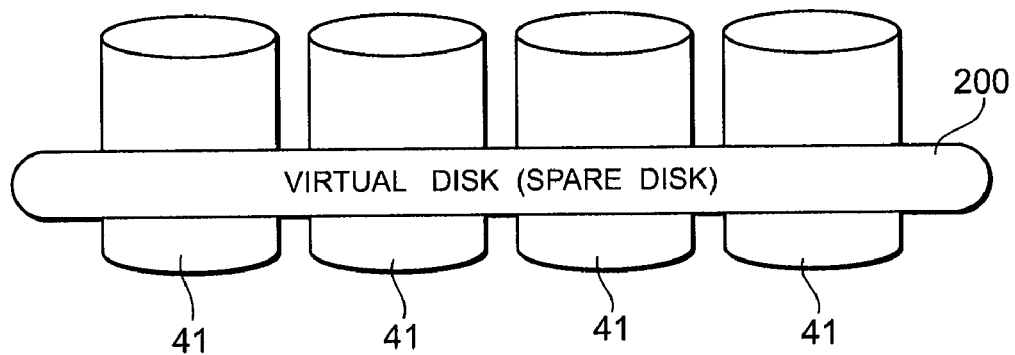
FIG. 9 is an explanatory diagram of a virtual spare disk according to an embodiment of the present invention.

Furthermore, the spare disk is not necessarily a physical device, and may be a virtual device. FIG. 9 shows an example in which a virtual device 200 is formed by grouping four data disks 41 (3D+P1), and the virtual disk 200 operates as a spare disk.

According to the present invention, after the completion of correction copy to a spare disk, or the completion of dynamic sparing performed on the spare disk, the disk management for the data disk and that for the spare disk are altered, making it possible to omit copyback to a new data disk mounted as a replacement, and thus reduce data recovery time by half compared with conventional techniques.

What is claimed is:

1. A disk array system comprising:
   a plurality of data disks providing one or more RAID (redundant array of independent disks) groups;
   one or more spare disks;
   a controller that controls data input and output to and from the data disks and the spare disks;
   a RAID configuration management table that registers a correspondence relationship between a logical location and a physical location for each of the data disks in the RAID groups; and
   a spare disk management table that registers a correspondence relationship between a logical location and a physical location for each of the spare disks,
   wherein the controller, upon a failure occurring in any of the data disks, updates the RAID configuration management table and the spare disk management table by interchanging the physical location of a spare disk of the plurality of spare disks and the physical location of the data disk causing the failure, and then performs, after interchanging the physical location of the spare disk of the plurality of spare disks and the physical location of the data disk causing the failure, a correction copy to the spare disk from other data disks belonging to the RAID group to which the data disk causing the failure belongs.

2. The disk array system according to claim 1,
   wherein a plurality of physical specifications used as spare disk selection criteria are provided and given an order of priority, and
   wherein at least one of the spare disks is selected based on the spare disk selection criteria.

3. The disk array system according to claim 2, wherein the order of priority of the plurality of the physical specifications can be changed based upon the system configuration.

4. A method for controlling a disk array system comprising the steps of:
   registering a correspondence relationship between a logical location and a physical location of each of a plurality of data disks in a RAID (redundant array of independent disks) group in a RAID configuration management table in advance;
   registering a correspondence relationship between a logical location and a physical location of each of one or more spare disks in a spare disk management table in advance;
   detecting any failure caused in any data disk from among the plurality of data disks providing one or more RAID groups;
   updating the RAID configuration management table and the spare disk management table by interchanging the physical location of a spare disk of the plurality of spare disks and the physical location of the data disk causing the failure; and
   performing, after interchanging the physical location of the spare disk of the plurality of spare disks and the physical location of the data disk causing the failure, a correction copy to the spare disk, from one or more other data disks belonging to the RAID group to which the data disk causing the failure belongs.

5. The method according to claim 4,
   wherein a plurality of physical specifications used as spare disk selection criteria are provided and given an order of priority, and
   wherein at least one of the spare disks is selected based on the spare disk selection criteria.

6. The method according to claim 5, wherein the order of priority of the plurality of the physical specifications can be changed based upon the system configuration.

* * * * *